United States Patent [19]
Koller et al.

[11] Patent Number: 5,458,099
[45] Date of Patent: Oct. 17, 1995

[54] CYLINDER HEAD ARRANGEMENT OF AN INTERNAL-COMBUSTION ENGINE

[75] Inventors: Gerhard Koller, Ditzingen; Hans-Joachim Esch, Heimsheim; Winfried Distelrath, Stuttgart; Roland Hauf, Leonberg, all of Germany

[73] Assignee: Dr. Ing. h.c.F. Porsche AG, Weissach, Germany

[21] Appl. No.: 279,651

[22] Filed: Jul. 25, 1994

[30] Foreign Application Priority Data

Jul. 23, 1993 [DE] Germany ............................ 43 24 791.1

[51] Int. Cl.[6] ........................................ F02F 1/24
[52] U.S. Cl. ................................. 123/193.5; 29/888.06
[58] Field of Search ............................ 123/193.5, 193.3, 123/90.27, 90.31, 90.1, 90.6; 29/888.01, 888.06, 888.46

[56] References Cited

U.S. PATENT DOCUMENTS

| | | | |
|---|---|---|---|
| 4,497,289 | 2/1985 | Bortolussi | 123/193.5 |
| 4,612,885 | 9/1986 | Yoshikawa | 123/193.3 |
| 4,823,747 | 4/1989 | Wagner et al. | 123/193.5 |
| 4,972,813 | 11/1990 | Sugiura | 123/193.3 |
| 5,123,385 | 6/1992 | Sado et al. | 123/90.27 |
| 5,150,675 | 9/1992 | Murata | 123/193.5 |
| 5,213,071 | 5/1993 | Iwata et al. | 123/193.5 |

FOREIGN PATENT DOCUMENTS

| | | |
|---|---|---|
| 0146254 | 6/1985 | European Pat. Off. . |
| 109361 | 12/1967 | United Kingdom . |

OTHER PUBLICATIONS

"Formula I, Engines Under the Microscope", first edition, Dec. 1985.

*Primary Examiner*—Marguerite Macy
*Attorney, Agent, or Firm*—Evenson McKeown Edwards & Lenahan

[57] ABSTRACT

A cylinder head is composed of a basic housing resting on a cylinder block, said housing having gas exchange channels and valves, a bearing housing supporting camshafts and cup tappets, and a cylinder head cover. This cover is made integral with the upper parts of the camshaft bearings. The arrangement has a single separating plane, at which both the basic housing with elevated outside walls and the bearing housing and the cylinder head cover abut. This arrangement has high rigidity and is easy to assemble.

10 Claims, 3 Drawing Sheets

5,458,099

CYLINDER HEAD ARRANGEMENT OF AN INTERNAL-COMBUSTION ENGINE

BACKGROUND AND SUMMARY OF THE INVENTION

The invention relates to a cylinder head arrangement including a basic housing engaging an engine cylinder block and containing housing gas exchange channels and valves controlling same, a bearing housing with lower bearing parts for at least one camshaft, and a cylinder head cover.

In the German book "Formula I Engines Under the Microscope," first edition, 1985, an internal combustion engine is disclosed on page 165 with a multiple -part cylinder head whose basic housing placed on the cylinder block bears the gas exchange channels and the valves. This basic housing, on the side away from the cylinder block, has raised outside walls with a flange running around the outside, between which bearing strips with the lower parts of camshaft bearings are inserted in the housing. Individual bearing surfaces are bolted to these strips. This basic housing is covered by a cylinder head cover which fits over the bearing surfaces like a roof and is bolted to the flange. This cylinder head thus has a single separating plane that must be sealed from the environment.

From Volvo Service Manual TP 317 14/2, page 11, a cylinder head is known for engine Model B6304 in which the basic housing is made in one piece with the lower parts of camshaft bearings. A cylinder head cover supporting the upper parts of the bearings abuts the single separating plane of this cylinder head.

To achieve a material joint which is optimum and in particular very strong on the combustion chamber side, it is desirable to produce the same by a casting method that is largely free of undercuts, as is possible for example with the prior art where the resultant cylinder head made in multiple-part form, because of insufficient rigidity, frequently suffers from oil losses at the separating plane(s).

An object of the invention is to improve a cylinder head arrangement of the above-noted type in such fashion that both a high-strength material joint and a high overall rigidity in the assembled state can be achieved.

This object is achieved according to preferred embodiments of the invention by providing a cylinder head arrangement with a basic housing, a bearing housing and a cylinder head cover, wherein upper bearing parts for the at least one camshaft bearings are made integral with the cylinder head cover, and wherein the cylinder head cover has a flange surface which abuts against both outside walls of the basic housing and against matching surfaces of the bearing housing.

When in such an arrangement, the upper parts of the camshaft bearings are made integral with the cylinder head cover and the cover has a flanged surface at which both the outside walls of the basic housing and the matching surfaces of the bearing housing abut, on the one hand the number of parts to be joined is reduced to three, namely the basic housing, bearing housing, and the cover, so that the overall rigidity of the assembled head is increased. On the other hand, the possibility is provided for an optimum casting method, especially for the basic housing that bears the combustion chamber. In addition, the height can be kept small since no additional hood is placed over the camshaft housing.

The common abutting of the outside walls and the matching surface of the bearing housing on the flange surface of the cylinder head cover constitutes a series arrangement of two narrow passageways for the oil flung off the valve drive, so that the escape of oil can be prevented using comparatively simple means.

In one advantageous embodiment, this arrangement has a single separating plane in which the flange surface is located and which the basic housing, the camshaft housing, and the cylinder head cover abut. During manufacture and assembly, this produces a single plane that must be machined and a single defined reference plane for the required bolting and the resulting stamping and possible shaping.

Viewed from a central lengthwise plane, and arranged on both sides thereof in mutually parallel planes, bolted connections are provided, with a first set of bolted connections clamping the bearing housing between the cylinder head cover and the basic housing, a second set of bolted connections clamping the bearing housing to the basic housing, a third set of bolted connections clamping the cylinder head cover to the camshaft housing, and a fourth set of bolted connections connecting the basic housing with the cylinder head cover.

The first, second and third sets of bolted connections traverse the separating plane and extend through the cylinder head cover which they abut. The fourth bolted connections tighten the bearing housing in the area between two adjacent receptacles for cup tappets against the basic housing, while further bolted connections hold the basic housing to the cylinder block.

Centrally above each cylinder on the internal combustion engine, there is a shaft or opening to receive a spark plug or a fuel injector. These shafts are divided between the basic housing and the bearing housing and, to ensure a good seal, have sixth bolted connections located adjacent to the shafts.

This arrangement of the bolted connections ensures unambiguous and reliable assembly and accessibility. The basic housing is first achieved by means of bolted connection to the cylinder block. The position and number of these bolted connections is not limited because of their free accessibility. Then the bearing housing is connected by means of two bolted connections with a supporting surface on the basic housing. The position of the planes receiving these bolted connections is arranged so that the forces that are introduced into the bearing housing by the operation of the valves produce only extremely minor bending of this housing. In the separating plane, the surfaces located in this plane can then be machined in a chuck. Then, the cylinder head cover is installed and connected with the other parts by means of three bolted connections so that the bearings for the camshafts can be drilled. Then, the camshafts are inserted and the cylinder head cover is mounted again. Thanks to the comparatively large supporting surface located in the separating plane of the cylinder head cover on the bearing housing or the outside walls of the basic housing and a relatively broad support of the bearing housing on this basic housing, a rigid connection of the parts involved is produced.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
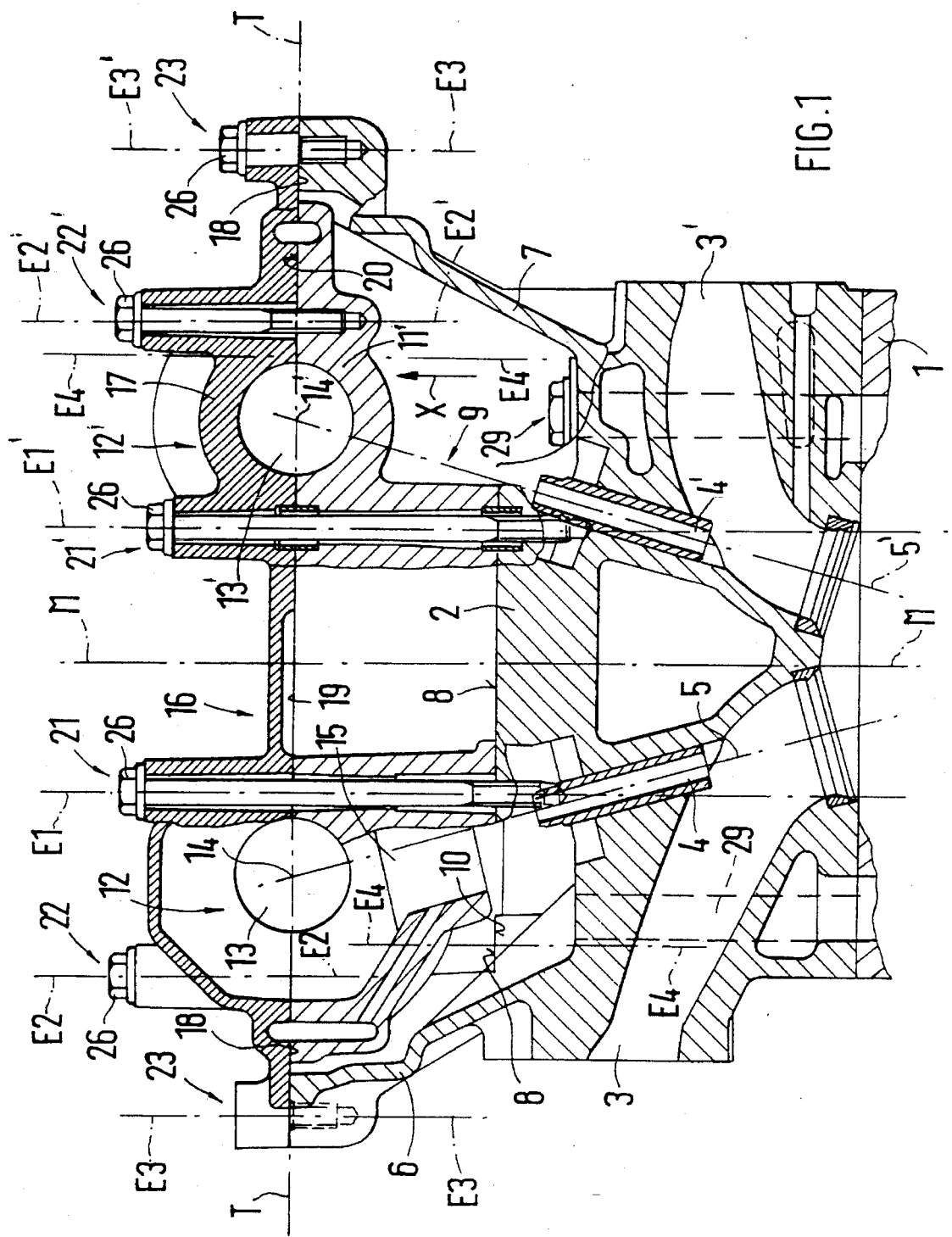
FIG. 1 is a cross-section through a cylinder head arrangement, partially along line I—I in FIG. 2, constructed according to a preferred embodiment of the invention.
Figure 2:
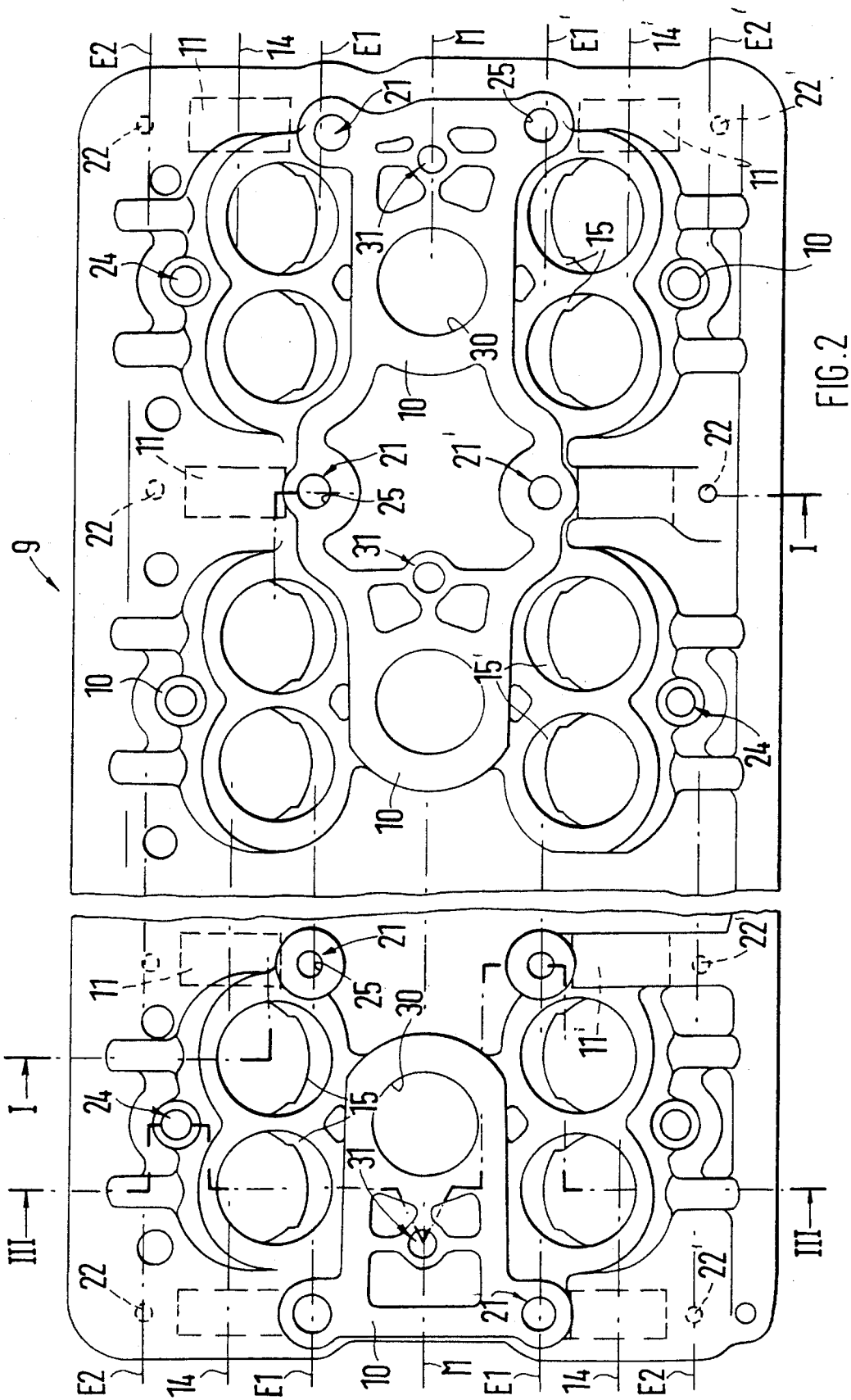
FIG. 2 is a bottom view of the bearing housing looking in the direction of arrow X according to FIG. 1.
Figure 3:
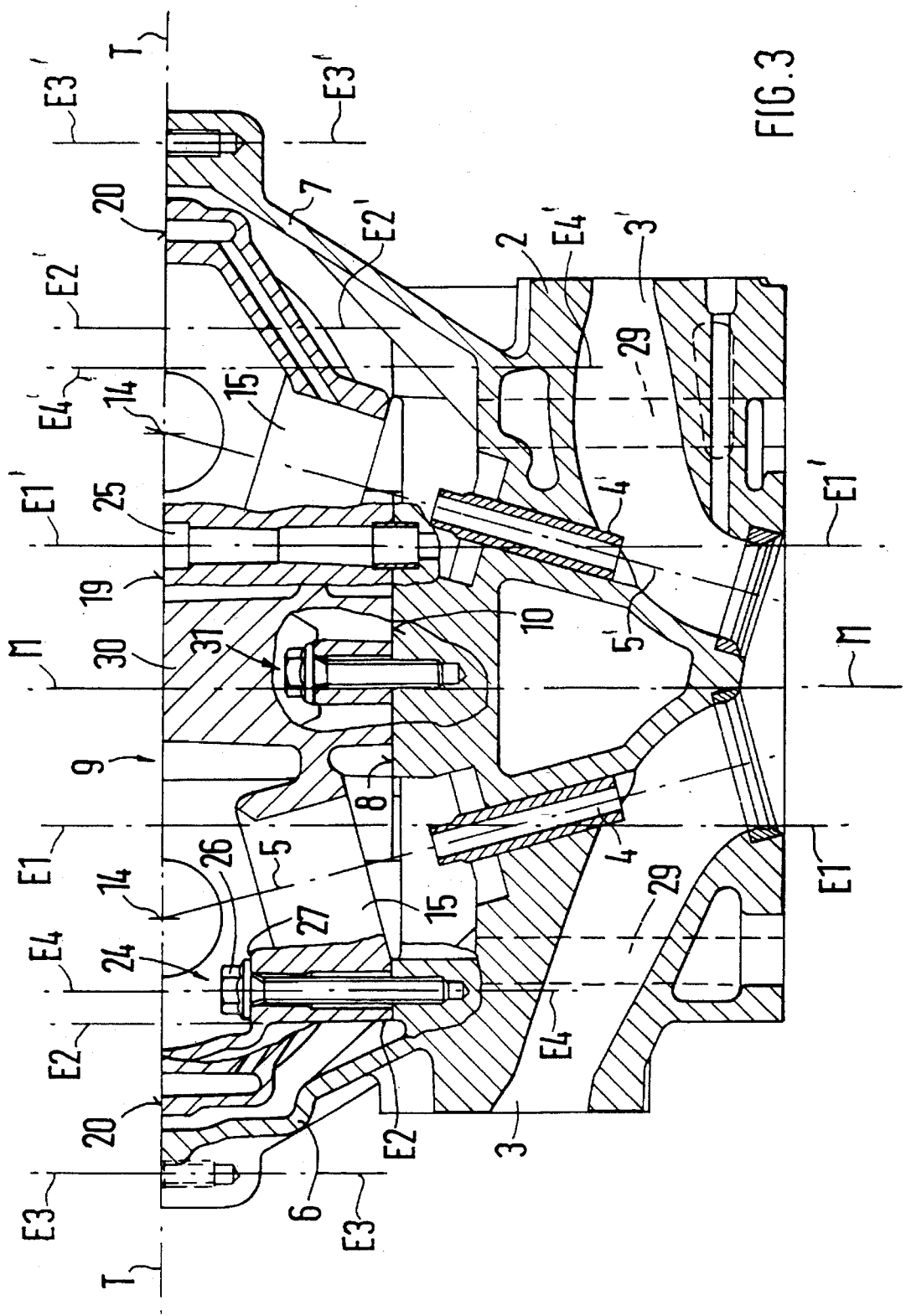
FIG. 3 is another cross-section through the cylinder head arrangement, partially along line III—III in FIG. 2.

An internal combustion engine has a cylinder head arrangement mounted on a cylinder block 1 whose basic housing 2 has gas exchange channels 3, 3' and guides 4, 4' for cup tappets which move along axes 5, 5' arranged at an angle to a central lengthwise plane M—M.

Basic housing 2 has outside walls 6 and 7 which are raised relative to a supporting surface 8 located in the vicinity of central lengthwise plane M—M, up to a separating plane T—T of the cylinder head arrangement. In the space which is delimited by this separating plane T—T, by outside walls 6, 7, and by supporting surface 8, a bearing housing 9 is located which abuts supporting surface 8 by a supporting surface 10. Bearing housing 9 has lower bearing parts 11, 11' of camshaft bearings 12, 12' in which camshafts 13, 13' rotate around their lengthwise axes 14, 14' as well as receptacles 15, 15' for cup tappets.

A cylinder head cover 16 is placed on separating plane T—T, said cover having corresponding upper bearing parts 17. Both outside walls 6, 7 and a matching surface 20 formed on an upper side 19 of bearing housing 9 abut an externally circumferential flange area 18 of cylinder head cover 16 lying in separating plane T—T.

Planes E1, E1', E2, E2', E3, E3', E4 and E4' extend at lateral sides of the central lengthwise plane M-M and parallel thereto. Bolted connections 21, 21', 22, 22', 23, 23', 24 and 24' extend in respective ones of these planes E1, E1', E2, E2', E3, E3', E4 and E4'. Bolted connections 21 to 23 traverse through-openings 25 of cylinder head cover 16 and abut the latter with bolt heads 26.

Bolted connections 22, 22' engage the supporting surface 8 of the basic housing 2 with threads. The bolted connections 21 traverse bearing housing 9 and tighten the latter between the cylinder head cover 16 and the basic housing 2. The bolt heads 26 of the bolted connections 24 abut stops 27 located between receptacles 15 provided pairwise. The bolted connections 23, 23' engage outside walls 6, 7. The bolted connections 24, 24' engage bearing housing 9 in the vicinity of lower bearing parts 11, 11'.

The lengthwise axes 14 of the camshafts 13, 13' extend between the respective planes E1 and E2 (and E3 and E4), while the matching surfaces 20 are located between the respective planes E2 and E3 (and E2' and E3').

Basic housing 2 is held on cylinder block 1 by means of bolted connections 29.

Above the individual cylinders of the internal combustion engine, openings 30 are provided which are divided between supporting surface 8 and supporting surface 10. Adjacent to respective openings 30, which receive a fuel injector not shown, bolted connections 31 are provided which are closely adjacent to the central lengthwise plane M—M. Bolted connections 31 join the bearing housing 9 to the basic housing 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Cylinder head arrangement of an internal combustion engine, comprising:
    a basic housing having gas exchange channels and valves controlling the latter, said basic housing being configured to be placed on a cylinder block in use on an assembled engine,
    a bearing housing to support at least one camshaft, said bearing housing having integrally formed lower bearing parts for the at least one camshaft, and
    a cylinder head cover,
    wherein upper bearing parts for the at least one camshaft are made integral with the cylinder head cover, and wherein the cylinder head cover has a flange surface which abuts against both outside walls of the basic housing and against matching surfaces of the bearing housing.

2. Arrangement according to claim 1, wherein the cylinder head cover flange surface is disposed in a single separating plane containing abutting surfaces of the basic housing, bearing housing and the cylinder head cover.

3. An arrangement according to claim 2, wherein said bearing housing and cylinder head cover include respective bearing parts for first and second camshafts extending parallel to one another at opposite sides of a central lengthwise plane of the cylinder head arrangement,
    wherein first and second bolted connections are provided in respective first and second connection planes at one lateral side of the central lengthwise plane, said first and second connection planes being spaced from one another and being parallel to the central lengthwise plane,
    wherein third and fourth bolted connections are provided in respective third and fourth connection planes at an opposite lateral side of the central lengthwise plane, said third and fourth connection planes being spaced from one another and parallel to the central lengthwise plane,
    and wherein the axis of the first camshaft extends between the first and second connection planes and the axis of the second camshaft extends between the third and fourth connection planes.

4. Arrangement according to claim 3, wherein fifth and sixth bolted connections are provided at respective fifth and sixth connection planes which traverse the cylinder head cover and engage in the basic housing at the outside walls of the basic housing.

5. Arrangement according to claim 4, wherein the first and third bolted connections connect the cylinder head cover directly with the basic housing and extend through the bearing housing and engage in threaded bores in the basic housing.

6. Arrangement according to claim 5, wherein the second and fourth bolted connections connect the cylinder head cover directly with the bearing housing and engage threaded bores in the bearing housing.

7. Arrangement according to claim 4, wherein cylinder head covers abutting surfaces are provided on the bearing housing between the third connection plane and the fifth connection plane and between the fourth connection plane and the fifth connection plane.

8. Arrangement according to claim 4, wherein seventh and eighth bolt connections are located in respective seventh and eighth connection planes to hold the bearing housing at the basic housing, said seventh and eighth bolt connections abuttingly clamp against the bearing housing at locations below the cylinder head cover adjacent receptacles for cup tappets on the basic housing.

9. Arrangement according to claim 1, wherein lengthwise axes of the camshaft extend between a central cylinder head plane and respective planes for bolted connections between the bearing housing and the basic housing.

10. A method of making an internal combustion engine having a cylinder head arrangement including:

a basic housing having gas exchange channels and valves controlling the latter, said basic housing being configured to be placed on a cylinder block in use on an assembled engine, a bearing housing to support at least one camshaft, said bearing housing having integrally formed lower bearing parts for the at least one camshaft, and a cylinder head cover, wherein upper bearing parts for the at least one camshaft are made integral with the cylinder head cover, and wherein the cylinder head cover has a flange surface which abuts against both outside walls of the basic housing and against matching surfaces of the bearing housing, said method comprising the sequential steps of:

(i) attaching the basic housing by means of a bolted connection to the cylinder block;

(ii) connecting the bearing housing by means of two bolted connections with a supporting surface on the basic housing, which bolted connections are arranged for minimizing bending forces introduced to the bearing housing during operation of the valves, (iii) machining separating plane surfaces on both the basic housing and bearing housing, (iv) connecting the cylinder head cover with the basic housing and bearing housing by bolted connections, (v) machining bearing parts for the camshafts, (vi) removing the cylinder head cover, (vii) inserting the camshafts in the bearing parts in the bearing housing, and (viii) reconnecting the cylinder head cover with the basic housing and bearing housing by bolted connections.

\* \* \* \* \*